United States Patent
Warey et al.

(10) Patent No.: US 11,407,289 B2
(45) Date of Patent: Aug. 9, 2022

(54) METHOD AND APPARATUS FOR WINDSHIELD HEATING USING CARBON NANOTUBE HEATING PAD

(71) Applicant: GM GLOBAL TECHNOLOGY OPERATIONS LLC, Detroit, MI (US)

(72) Inventors: Alok Warey, Novi, MI (US); Chih-Hung Yen, Bloomfield Hills, MI (US); Taeyoung Han, Bloomfield Hills, MI (US); Kuo-Huey Chen, Troy, MI (US); Bahram Khalighi, Birmingham, MI (US); Paul E. Krajewski, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 485 days.

(21) Appl. No.: 16/520,903

(22) Filed: Jul. 24, 2019

(65) Prior Publication Data
US 2021/0023914 A1    Jan. 28, 2021

(51) Int. Cl.
*B60J 1/00* (2006.01)
*H05B 3/14* (2006.01)
*B60J 1/06* (2006.01)

(52) U.S. Cl.
CPC ............... *B60J 1/002* (2013.01); *B60J 1/06* (2013.01); *H05B 3/145* (2013.01)

(58) Field of Classification Search
CPC .. B60J 1/002; B60J 1/06; H05B 3/145; H05B 3/84; H05B 3/34; H05B 3/347; H05B 3/0042; H05B 3/0047; H05B 3/008; H05B 3/345; H05B 2214/04; H05B 2214/02; H05B 1/0236; H05B 1/0294; H05B 2203/031; H05B 2203/036; H05B 2203/015
See application file for complete search history.

(56) References Cited

U.S. PATENT DOCUMENTS

2013/0284718 A1* 10/2013 Feng ............... H05B 3/145
219/539
2016/0286608 A1* 9/2016 Maughan ........... H05B 1/0236

* cited by examiner

*Primary Examiner* — Shawntina T Fuqua
(74) *Attorney, Agent, or Firm* — Lorenz & Kopf LLP (57) ABSTRACT

Methods and apparatus are provided for heating a vehicle window to remove ice and condensation using a carbon nanotube heating pad. The apparatus includes a user interface operative to receive a user request, a vehicle windshield, a heating pad wherein the heating pad includes a carbon nanotube heating element and a reflective surface and is oriented such that the carbon nanotube heating element is directed towards the windshield, a power supply operative to supply power to the carbon nanotube heating element in response to a control signal, and a processor operative to generate the control signal in response to the user request.

20 Claims, 5 Drawing Sheets

METHOD AND APPARATUS FOR WINDSHIELD HEATING USING CARBON NANOTUBE HEATING PAD

INTRODUCTION

The present disclosure relates generally to a system for defogging and deicing a vehicle windshield. More specifically, aspects of the present disclosure relate to systems, methods and devices for.

Early in the development of automobiles, it was established that a mechanism for defogging and deicing a vehicle windshield is required for safe and convenient operation of the motor vehicle. Fog and ice may obscure the drivers view outside of the vehicle and the obstruction may occur during operation of the vehicle, such as during a snowstorm or due to a change in humidity. Condensation on the inside of the window surfaces may be caused by vehicle occupant respiration and other moisture in the vehicle cabin. Ice and snow may accumulate on the vehicle windshield and windows during operation of the vehicle.

Traditionally for vehicles with internal combustion engines, a portion of the engine heat is captured by a heater core and warm air is passed through the heater core and directed over the windshield. This warmed air may then melt any ice on the windshield or warm the glass surface thereby removing the foggy condition. A problem arises with electric vehicles in that they do not have an internal combustion engine to capture heat from. Typically, electric vehicles use a larger percentage of battery power heating resistive elements and the like in order to generate the warm air required to remove ice and condensation from the window surfaces in the traditional manner. It would be desirable to overcome these problems in order to decrease the response time of windshield deicing/defogging system in electric vehicles, to reduce energy consumption penalty of the windshield deicing system and to improvement of customer experience The above information disclosed in this background section is only for enhancement of understanding of the background of the invention and therefore it may contain information that does not form the prior art that is already known to a person of ordinary skill in the art.

SUMMARY

Disclosed herein are human machine interface methods and systems and related control logic for provisioning computational systems, methods for making and methods for operating such systems, and motor vehicles equipped with onboard control systems. By way of example, and not limitation, presented are various embodiments of vehicle window heating and deicing are disclosed herein.

In accordance with an aspect of the present invention an apparatus having a user interface operative to receive a user request, a vehicle windshield, a heating pad wherein the heating pad includes a carbon nanotube heating element and a reflective surface and is oriented such that the carbon nanotube heating element is directed towards the windshield, a power supply operative to supply a voltage to the carbon nanotube heating element in response to a control signal, and a processor operative to generate the control signal in response to the user request.

In accordance with another aspect of the present invention wherein the heating pad is configured as a thin flexible sheet and wherein the carbon nanotube heating element is the first side of the sheet and the reflective surface is the second side of the sheet.

In accordance with another aspect of the present invention having a temperature sensor operative to measure an ambient temperature and wherein the control signal is generated in response to the ambient temperature being indicative of a freezing condition.

In accordance with another aspect of the present invention wherein the power supply is operative to remove the voltage from the carbon nanotube heating element in response to an absence of the control signal and wherein the processor is operative to discontinue the control signal in response to an elapsed time of the voltage being supplied to the carbon nanotube heating element.

In accordance with another aspect of the present invention wherein the heating pad is positioned on a vehicle surface proximate to a lower edge of the vehicle windshield.

In accordance with another aspect of the present invention wherein the heating pad is deployed from a recess within a vehicle surface proximate to the vehicle windshield in response to the user request.

In accordance with another aspect of the present invention wherein the heating pad is deployed from a recess within a vehicle surface proximate to the vehicle windshield such that the heating pad convers a portion of an inside surface of the vehicle windshield after deployment.

In accordance with another aspect of the present invention the user request is received in response to a prompt displayed on the user interface and wherein the prompt is generated in response to an ambient temperature being below a threshold value.

In accordance with another aspect of the present invention a method for receiving a first user input via a user interface, engaging a power supply in response to the first user input to apply a voltage to a heating element proximate to a vehicle windshield wherein the heating element is a carbon nanotube pad operative to generate an infrared radiation in response to the voltage, receiving a second user input via the user interface, and disengaging the power supply in response to the second input to decouple the voltage from the heating element.

In accordance with another aspect of the present invention wherein the heating element is configured as a thin flexible sheet and wherein the carbon nanotube pad is the first side of the sheet and a reflective surface is the second side of the sheet.

In accordance with another aspect of the present invention wherein the carbon nanotube pad is nonwoven and is operative to emit an infrared radiation in response to the voltage.

In accordance with another aspect of the present invention including determining an ambient temperature and wherein a magnitude of the voltage is selected in response to the ambient temperature.

In accordance with another aspect of the present invention wherein the heating element is located proximate to a vehicle windshield.

In accordance with another aspect of the present invention wherein the heating element is deployed from a recess within a vehicle surface proximate to a vehicle windshield such that the heating element convers a portion of an inside surface of the vehicle windshield after deployment.

In accordance with another aspect of the present invention wherein the heating element is deployed from a recess within a vehicle surface proximate to a vehicle windshield in response to the first user input.

In accordance with another aspect of the present invention a vehicle windshield heating apparatus comprising a temperature sensor operative to detect a temperature outside of a vehicle cabin, a run state detector operative to detect a run state condition of a vehicle, a light detector operative to detect a light intensity through a vehicle windshield, a heating element having a carbon nanotube heating pad and a reflective surface wherein the carbon nanotube heating pad is positioned towards the vehicle windshield and the reflective surface is positioned away from the vehicle windshield such that the reflective surface is positioned to reflect infrared radiation from the carbon nanotube heating pad towards the vehicle windshield, a power supply operative to supply a voltage to the carbon nanotube heating pad in response to a control signal, and a processor operative to generate the control signal in response to the temperature outside of the vehicle cabin being below a threshold and the run state of the vehicle indicating a run state of the vehicle being operative.

In accordance with another aspect of the present invention wherein a magnitude of the voltage is established in response to the temperature outside of the vehicle cabin.

In accordance with another aspect of the present invention wherein the processor is further operative to generate the control signal in response light intensity being less than a threshold value indicative of an obscured windshield and wherein the processor is further operative to cease the control signal in response to the light intensity being higher than a second threshold value indicative of clear windshield.

In accordance with another aspect of the present invention wherein the voltage is a pulse width modulated voltage.

In accordance with another aspect of the present invention wherein the voltage is a pulse width modulated voltage and wherein a pulse width of the pulse width modulated voltage is selected in response to the temperature outside of the vehicle cabin.

The above advantage and other advantages and features of the present disclosure will be apparent from the following detailed description of the preferred embodiments when taken in connection with the accompanying drawings.

BRIEF DESCRIPTION OF THE DRAWINGS

The exemplary embodiments will hereinafter be described in conjunction with the following drawing figures, wherein like numerals denote like elements, and wherein.

The exemplifications set out herein illustrate preferred embodiments of the invention, and such exemplifications are not to be construed as limiting the scope of the invention in any manner.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
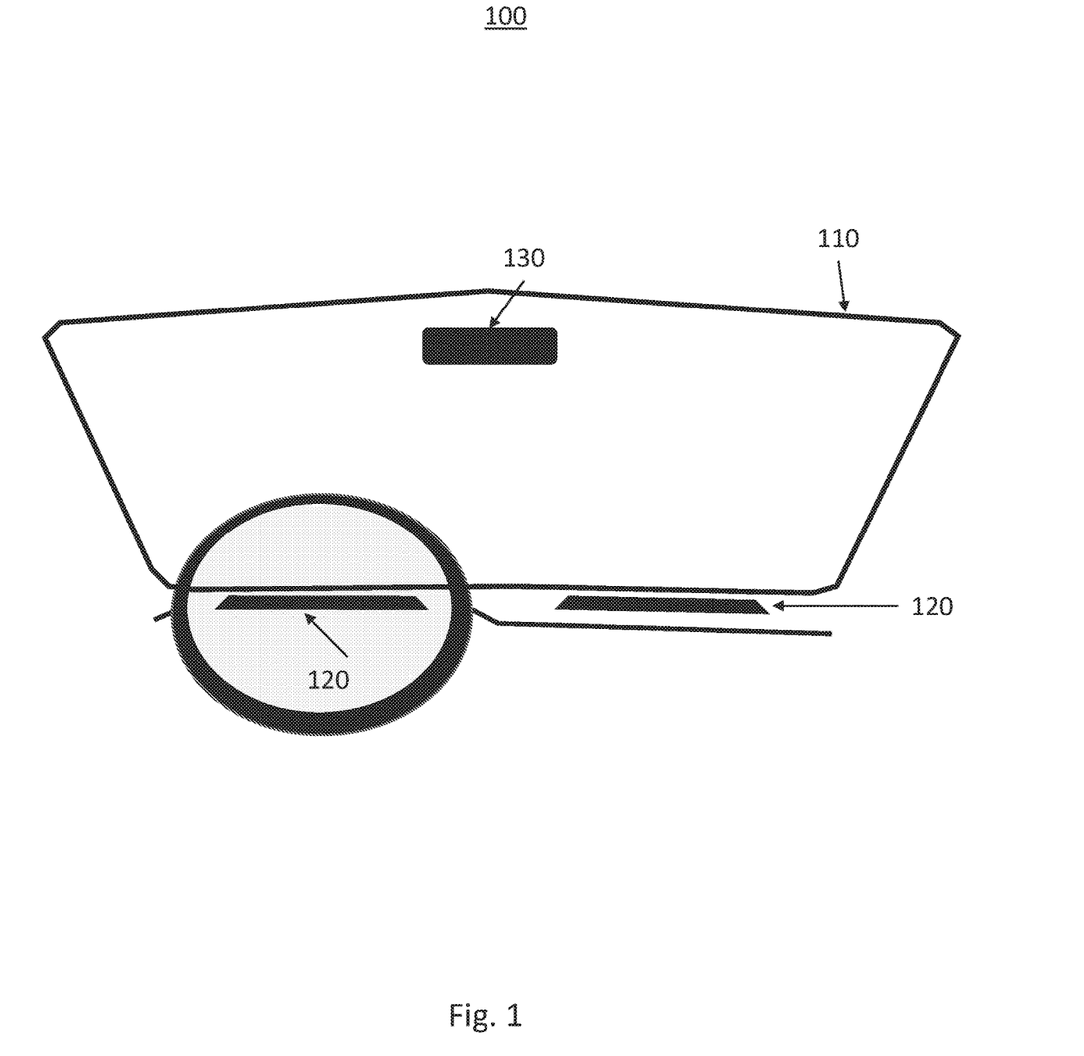
FIG. 1 shows an application for windshield heating using carbon nanotube heating pad in a motor vehicle according to an exemplary embodiment of the present disclosure.

Turning now to FIG. 1, an environment for a system 100 for windshield heating using carbon nanotube heating pad in a motor vehicle according to an exemplary embodiment of the present disclosure is shown. The exemplary environment 100 is illustrated by a forward facing view from a vehicle cabin. The exemplary environment includes a windshield 110, a rear view mirror 130 adhesively attached to the windshield and a plurality of heating elements 120. In an exemplary embodiment, the heating elements may include a radiant element backed by a reflective surface. The radiant element may be constructed of thin, flexible and configurable carbon nanotubes based non-woven heating sheet/pad that heats up the windshield through long-wave radiant heating. The reflective surfaces may be a material such as metal or reflective glass operative to reflect the long wave infrared radiant heating towards the windshield 110 in order to warm the glass to deice or defog the glass 110.

Maintaining adequate visibility at all times through a vehicle windshield is important for the safety and comfort aspects of passenger cars. Defrost/defogging systems are required to clear the windshield and side windows in a predetermined amount of time after the system has been switched on. The ability of windshield defrosting and defogging system to quickly clear ice on the outer windshield surface and condensation formed on the inner surface is therefore is important. For electric vehicles, a lower powered solution to this problem is required as heating and cooling of the vehicle cabin can greatly reduce the range of the electric vehicle.

The heating elements 120 may include a woven heating pad made of flexible carbon nanotubes which may be operative to deploy from the heating element cavity thereby enlarging the surface area of radiant element. For example, the radiant element may be a folded sheet of flexible carbon nanotubes backed by a reflective material. After deployment, a larger surface area of the radiant element is directed towards the windshield 110 thereby increasing the deicing efficacy of the heating element 120.

Figure 2:
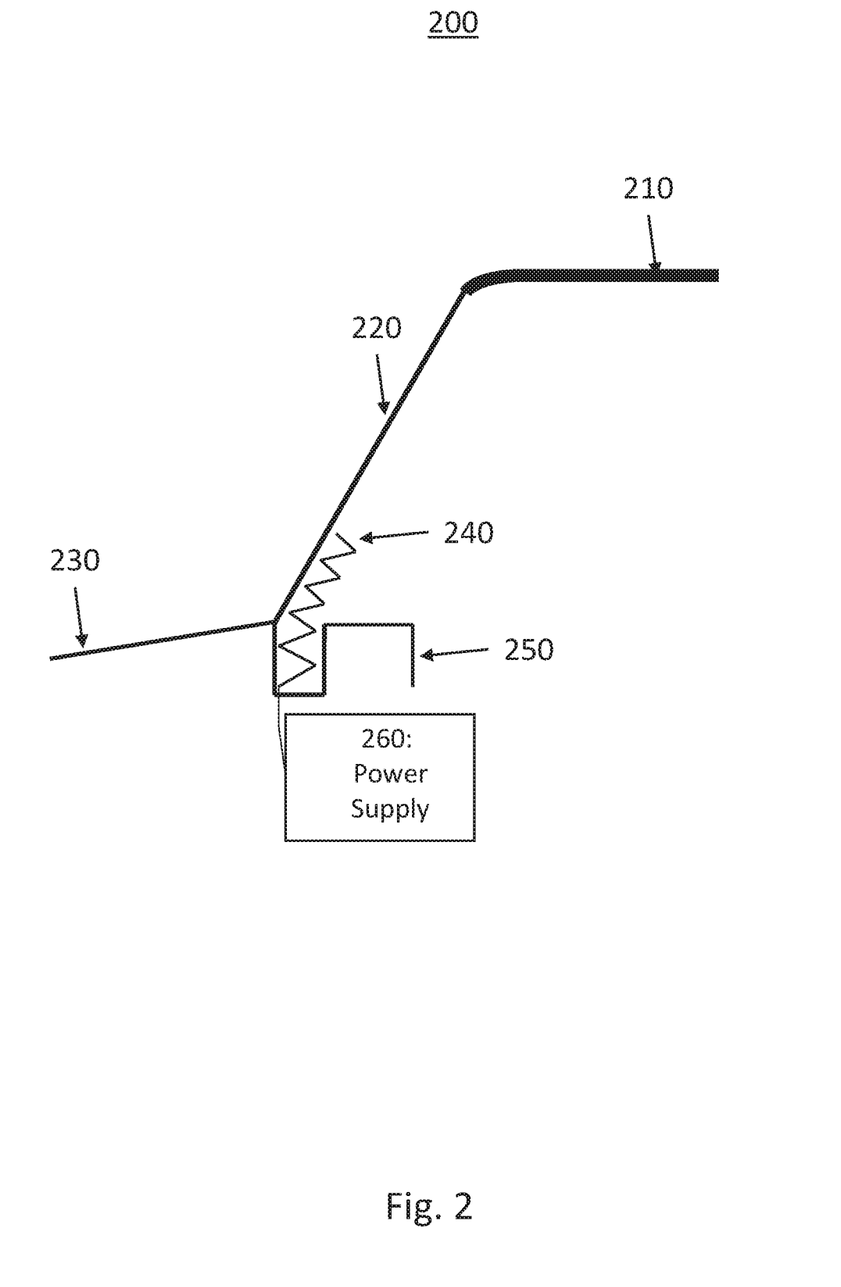
FIG. 2 shows another application for windshield heating using carbon nanotube heating pad in a motor vehicle according to an exemplary embodiment of the present disclosure.

Turning now to FIG. 2, an exemplary system 200 for windshield heating using carbon nanotube heating pad in a motor vehicle according to an exemplary embodiment of the present disclosure is shown. The exemplary system 200 is illustrated by showing a longitudinal cross section of a vehicle cabin having a roof 210, a windshield 220, an engine hood 230, an articulating structure 240 with heating element, a dashboard 250, and a power supply 260.

In this exemplary embodiment, the articulating structure 240 operative to deploy along the inner surface of the windshield 220 such that the desired areas if the windshield are exposed to the heating element when the articulated structure 240 is fully deployed. The articulating structure 240 may have a non-woven heating sheet or pad on the side directed to the windshield 220 when the articulating structure 240 is deployed and a reflective surface on the side of the articulating structure 240 facing the vehicle cabin and occupants.

When the articulating structure 240 is fully deployed, the power supply 260 is operative to apply a voltage to the heating pad side in order to activate the long wave radiant heating operation. The heating pad is then operative to radiate infrared light onto the windshield 220 which is converted to heat when received by the windshield 220, condensation, and ice. The heat then results in removal of the condensation and melting of any ice on the outside surface of the outside of the windshield 220.

The articulating structure 240 may be operated by cables or rigid members located on the sides of the articulating structure 240 such that the cables or rigid members are not within a driver line of sight when the articulating structure 240 is retracted. The articulating structure 240 may be deployed in response to a user input from a user interface or mobile device or may be deployed in response to a temperature sensor indicative of freezing conditions.

In an alternative embodiment, the articulating structure 240 may be housed in one or more of the roof pillars and deployed across the windshield 220 horizontally. For example, a first portion of the articulating structure 240 may be housed in the A pillar on the drivers side of the vehicle windshield 220 and a second portion of the articulating structure may be housed in the A pillar on the passenger side of the vehicle windshield 220. When deployed, the first portion of the articulating structure 240 and the second portion of the articulating structure 240 may cover half of the windshield 220, meeting in the middle of the windshield 220 at full deployment.

Figure 3:
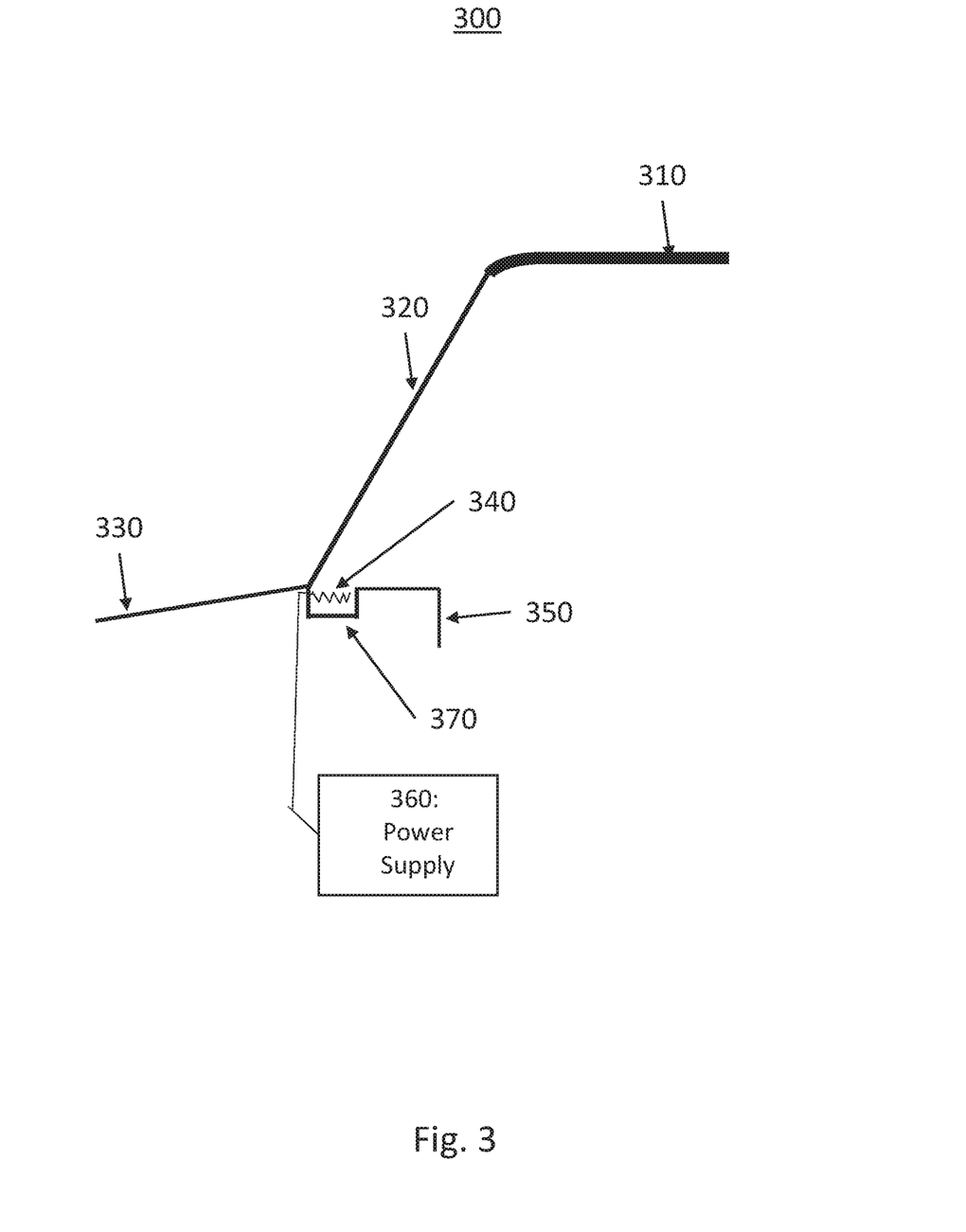
FIG. 3 shows another application for windshield heating using carbon nanotube heating pad in a motor vehicle according to an exemplary embodiment of the present disclosure.

Turning now to FIG. 3, another exemplary system 300 for windshield heating using carbon nanotube heating pad in a motor vehicle according to an exemplary embodiment of the present disclosure is shown. The exemplary system 300 is illustrated by showing a longitudinal cross section of a vehicle cabin having a roof 310, a windshield 320, an engine hood 330, a heating pad 340, a dashboard 350, a power supply 360 and a reflector 370.

In this exemplary embodiment, the heating pad 340 made from non-woven carbon nanotubes is backed by a reflector 370 such that the infrared radiation emitted from the heating pad 340 is directed towards the windshield 320. The reflector 370 may be fabricated with a metallic, mirrored, or reflective surface. Alternatively, the heating pad 340 and the reflective surface may be fabricated as two sides of a heating element such that all of the emitted infrared energy is radiated from the heating pad 340 side.

The heating pad 340 is operative to radiate infrared radiation towards the windshield 320 which is converted to heat when received by the windshield 320, condensation, and ice. The heat then results in removal of the condensation and melting of any ice on the outside surface of the outside of the windshield 320.

Figure 4:
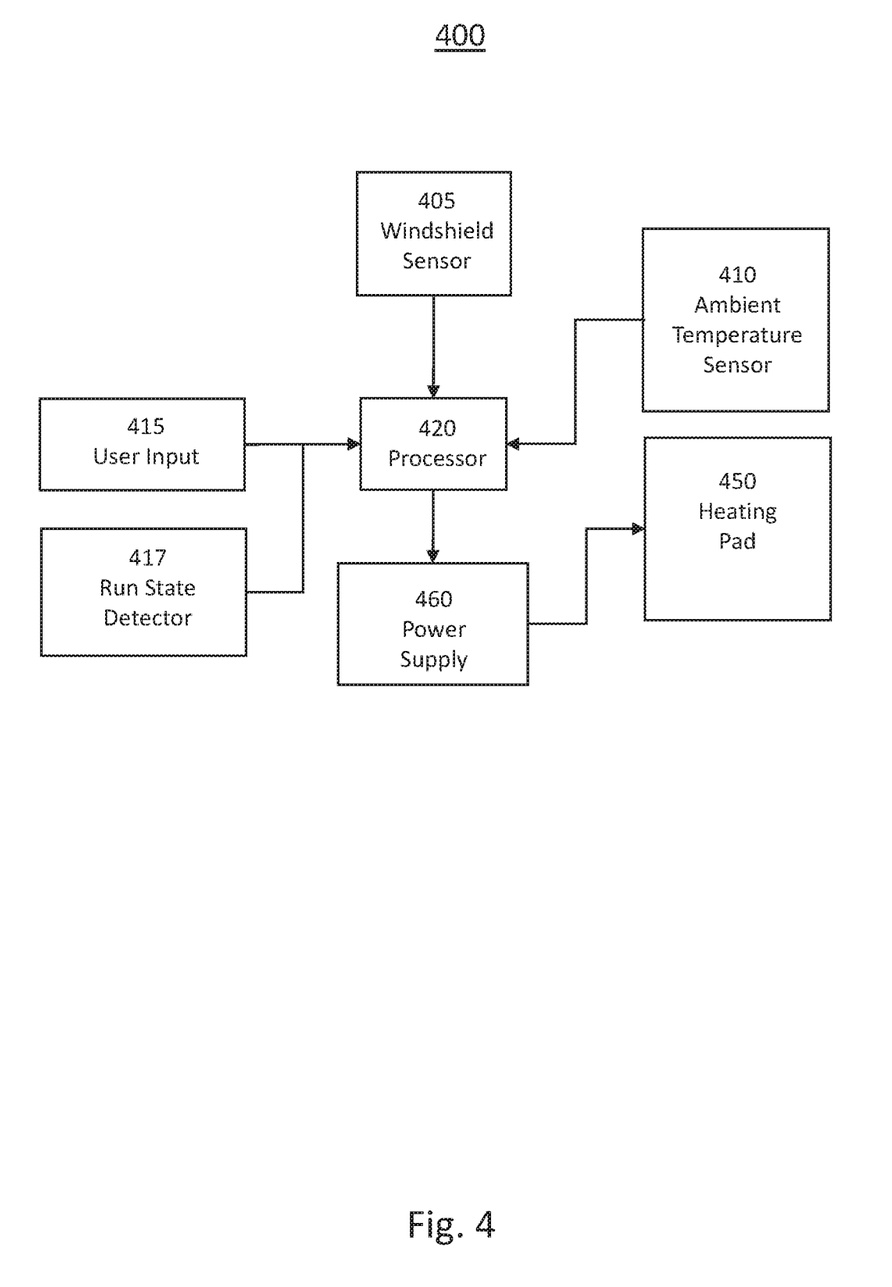
FIG. 4 shows a block diagram illustrating a system for windshield heating using carbon nanotube heating pad in a motor vehicle according to another exemplary embodiment of the present disclosure.

Turning now to FIG. 4, a block diagram of a system 400 for windshield heating using carbon nanotube heating pad in a motor vehicle according to an exemplary embodiment of the present disclosure is shown. The exemplary system 400 may be implemented within a vehicle as a windshield defogging or deicing system and may include a windshield sensor 405, an ambient temperature sensor 410, a processor 420, a user input 415, a power supply 460, and a heating pad 450.

The windshield sensor 405 is operative to detect ice on the windshield. In an exemplary embodiment, the windshield sensor 405 may be an optical sensor mounted inside the vehicle cabin, proximate to the windshield and is used to estimate the presence of ice and/or condensation on the windshield. The windshield sensor 405 may be mounted behind the rear view mirror, or the like, and be directly applied to the inner surface of windshield. The windshield sensor 405 is operative to couple a control signal to the processor 420 indicative of the possible presence of ice or other visual obstructions on the windshield. The control signal may be scaled in response to the magnitude of the visual obstruction. For example, the control signal may have a lower voltage for a minimally obscured view and a higher voltage for a highly obscured view.

The ambient temperature sensor 410 may be a temperature sensor or the like mounted outside the vehicle cabin for detecting a outside temperature around the vehicle. Ideally, the ambient temperature sensor 410 would be mounted away from any heat generating devices on the vehicle as not to corrupt the ambient temperature measurement. The ambient temperature sensor 410 may be operative to generate a control signal indicative of the measured temperature and couple this control signal to the processor.

The user input 415 may be a user interface device, such as touch screen, dial, or button located in the vehicle cabin and accessible to the driver. Alternatively, the user input 415 may be a program running on an electronic device, such as a mobile phone, and in communication with the vehicle, such as via a wireless network. The user input 415 is operative to collect instructions from a vehicle operator such as initiation and selection of a deicing or defogging function. In response to a selection by the vehicle operator, the user input 415 may be operative to couple a control signal or the like to the processor 420 for activation of the deicing function.

The heating pad 450 is operative to deice and/or defog the front and/or rear windshield and is fabricated using a thin, flexible and configurable carbon nanotubes based non-woven heating sheet/pad. The power supply 460 is controllably operable to apply a voltage to the heating pad 450 in order to initiate the deicing or defogging operation. In an exemplary implementation, the applied voltage may range from 12 volts to 24 volts and may be a pulse width modulated signal. In a first exemplary embodiment, the heating pad 450 may be a carbon nanotube heating element backed by a reflector in order to direct the infrared radiation onto the windshield. Alternatively, the heating pad may be a foldable sheet which can be deployed proximate to the windshield in order to reduce the distance between the heating pad and the windshield and maximize effectiveness. The heating pad 450 may be deployed from a cavity within the dashboard or from one or more roof pillars proximate to the window being heated. The power supply 460 may receive a signal from the processor 420 in order to initiate the heating operation. In addition, the power supply 460 may control the deployment of a retracted heating pad 450 by powering actuators, pulleys, or the like in response to another control signal from the processor 420.

The processor 420 is operative to control the application and removal of voltage to the heating pad 450 in performing the deicing or defogging operation. The processor 420 may receive a data or a signal from the windshield sensor 405, the user input 415, the ambient temperature sensor 410 and determine the requirement to perform the deicing operation. The duration of the operation may be dependent on values from these sensors. For example, if the signal from the ambient temperature sensor 410 is indicative of a very cold ambient temperature and the windshield sensor output 405 is indicative of a highly iced windshield, the duration of the deicing operation may be longer than that of a warmer ambient temperature with a minimally blocked windshield.

The processor 420 may be further operative to generate a control signal to couple to the power supply 460 to control the duration and intensity of the deicing and defogging operation. The processor 420 may be further operative to receive a signal from the user input 415 in order to start or stop the deicing process. The processor 420 would then be operative to generate the appropriate control signal for coupling to the power supply 460 in response to the user input signal.

In another exemplary embodiment, the system 400 may include a user interface 415 operative to receive a user request, a vehicle windshield, a heating pad 450 wherein the heating pad 450 includes a carbon nanotube heating element and a reflective surface and is oriented such that the carbon nanotube heating element is directed towards the windshield, a power supply 460 operative to supply a voltage to the carbon nanotube heating element in response to a control signal, and a processor 420 operative to generate the control signal in response to the user request. The heating pad 450 may be configured as a thin flexible sheet and wherein the carbon nanotube heating element is the first side of the sheet and the reflective surface is the second side of the sheet. The heating pad 450 may be positioned on a vehicle surface proximate to a lower edge of the vehicle windshield. Alternatively, the heating pad 450 may be deployed from a recess within a vehicle surface proximate to the vehicle windshield in response to the user request such that the heating pad convers a portion of an inside surface of the vehicle windshield after deployment. The user request may be received in response to a prompt displayed on the user input 415 and wherein the prompt is generated in response to an ambient temperature being below a threshold value The ambient temperature sensor 410 may be operative to measure an ambient temperature and wherein the control signal is generated in response to the ambient temperature being indicative of a freezing condition. The power supply 460 is operative to remove the voltage from the carbon nanotube heating element in response to an absence of the control signal and wherein the processor is operative to discontinue the control signal in response to an elapsed time of the voltage being supplied to the carbon nanotube heating element.

In an alternative exemplary embodiment, the ambient temperature sensor 410 is operative to detect a temperature outside of a vehicle cabin. A run state detector 417 may be operative to detect a run state condition of a vehicle. The windshield sensor 405 may be operative to detect a light intensity through a vehicle windshield. The heating pad 450 having a carbon nanotube heating element and a reflective surface wherein the carbon nanotube heating element is positioned towards the vehicle windshield and the reflective surface is positioned away from the vehicle windshield such that the reflective surface is positioned to reflect infrared radiation from the carbon nanotube heating element towards the vehicle windshield.

The exemplary system may further include a power supply 460 operative to supply a voltage to the carbon nanotube heating element in response to a control signal, and a processor 420 operative to generate the control signal in response to the temperature outside of the vehicle cabin being below a threshold and the run state of the vehicle indicating a run state of the vehicle being operative. The magnitude of the voltage may be established in response to the temperature outside of the vehicle cabin. The voltage may be a pulse width modulated voltage and the pulse width may be determined in response to the temperature outside of the vehicle cabin as detected by the ambient temperature sensor 410.

The processor 420 may be further operative to generate the control signal in response light intensity being less than a threshold value indicative of an obscured windshield and wherein the processor 420 is further operative to cease the control signal in response to the light intensity being higher than a second threshold value indicative of clear windshield.

Figure 5:
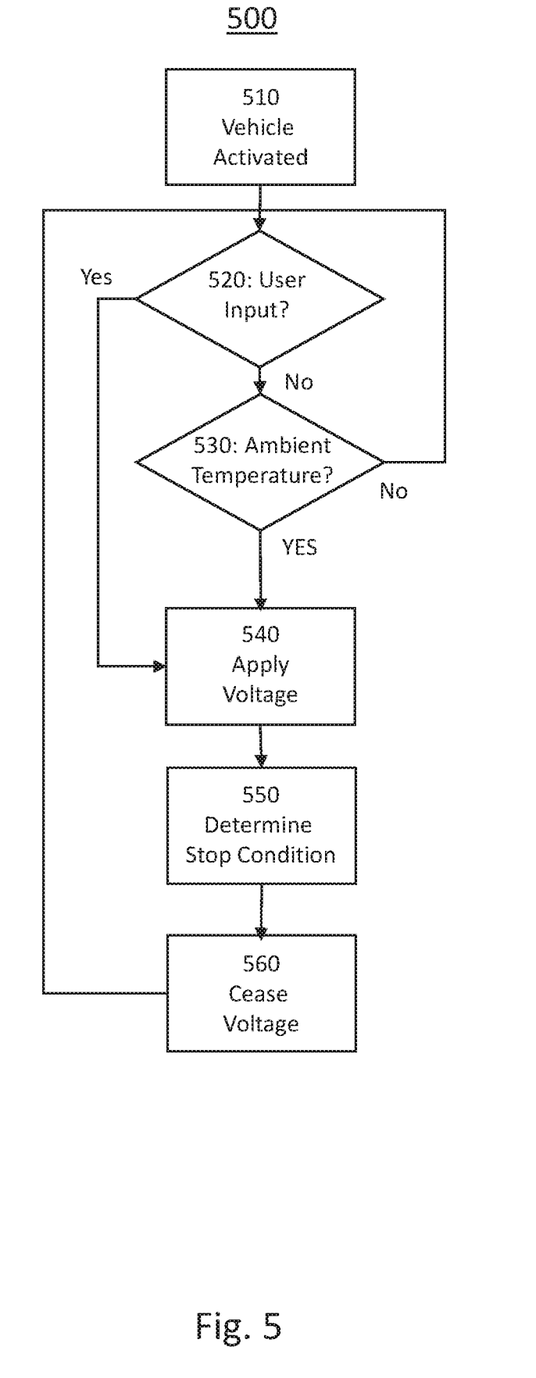
FIG. 5 shows a flow chart illustrating a method for windshield heating using carbon nanotube heating pad in a motor vehicle according to another exemplary embodiment of the present disclosure.

Turning now to FIG. 5, a flow chart illustrating an exemplary method 500 for windshield heating using carbon nanotube heating pad in a motor vehicle according to an exemplary embodiment of the present disclosure is shown. The method may first be initiated 510 in response to the vehicle being activated or placed in the on or operating state. The vehicle operating state may be determined in response to a signal from a vehicle controller, an ignition switch, a battery output or the like. The method may next operative to receive 520 a user input indicative of an initiation of a request to initiate the deicing operation. If the user input is received, the method is then operative to apply 540 a voltage to the heating sheet to initiate the deicing operation. If no user input is received 520, the method may then operative to determine 530 an ambient temperature outside of the vehicle. The ambient temperature may be determined in response to a temperature sensor located outside of the vehicle, or may be received via a wireless network, such as a cellular data network or the like.

If the ambient temperature is indicative of a potential of ice or condensation on the windshield, the method may then be operative to activate 540 the heating sheet. If the ambient temperature is not indicative of the potential for ice or condensation, the method is operative to return to monitoring 520 for a user input. In an alternative embodiment, the heating sheet may be activated in response to an ice sensor sensing ice on the windshield. The activation 540 of the heating sheet may be performed by generating a control signal for coupling to a power supply. The power supply may be operative to apply a voltage to the heating pad such that the heating pad is energized and is operative to radiate infrared energy. The method may then be operative to determine 550 a deicing stop condition cease in response to an elapsing of a predetermined length of time. Alternatively, the method may be operative to determine 550 the cease condition in response to a user input or in response to an output from the ice sensor indicative of the windshield being clear of ice. The method is then operative to cease 560 the voltage application. The voltage application may be ceased by generating a control signal to couple to the power supply indicating to cease the voltage application. The method is then operative to return to monitoring for the user input 520.

In an alternative exemplary embodiment the method may be operative to receive a first user input 520 via a user interface and to engage a power supply 540 in response to the first user input to apply a voltage to a heating element proximate to a vehicle windshield wherein the heating element is a carbon nanotube pad operative to generate an infrared radiation in response to the voltage. The heating element may be deployed from a recess within a vehicle surface proximate to the vehicle windshield. After deployment, the heating element may cover a portion of an inside surface of the vehicle windshield. The method may then be operative to receive a second user input via the user interface and to disengage the power supply in response to the second input to decouple the voltage from the heating element.

In this exemplary embodiment, the heating element may be configured as a thin flexible sheet and wherein the carbon nanotube pad is the first side of the sheet and a reflective surface is the second side of the sheet. The carbon nanotube pad may be nonwoven and operative to emit an infrared radiation in response to the voltage. The exemplary method may be further operative to determine an ambient temperature and wherein a magnitude of the voltage is selected in response to the ambient temperature.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An apparatus comprising:
   a vehicle windshield;
   a temperature sensor operative to detect a temperature outside of a vehicle;
   a run state detector operative to detect a run state condition of a vehicle;
   a heating pad wherein the heating pad includes a carbon nanotube heating element and a reflective surface oriented such that the carbon nanotube heating element is directed towards the vehicle windshield and the reflective surface is positioned to reflect infrared radiation from the carbon nanotube heating pad towards the vehicle windshield;
   a power supply operative to supply a voltage to the carbon nanotube heating element in response to a control signal; and
   a processor operative to generate the control signal in response to the temperature outside of the vehicle cabin being below a threshold and the run state of the vehicle indicating the vehicle being operative.

2. The apparatus of claim 1 wherein the heating pad is configured as a thin flexible sheet and wherein the carbon nanotube heating element is the first side of the sheet and the reflective surface is the second side of the sheet.

3. The apparatus of claim wherein the control signal is generated in response to the ambient temperature being indicative of a freezing condition.

4. The apparatus of claim 1 wherein the power supply is operative to remove the voltage from the carbon nanotube heating element in response to an absence of the control signal and wherein the processor is operative to discontinue the control signal in response to an elapsed time of the voltage being supplied to the carbon nanotube heating element.

5. The apparatus of claim 1 wherein the heating pad is positioned on a vehicle surface proximate to a lower edge of the vehicle windshield.

6. The apparatus of claim 1 wherein the heating pad is deployed from a recess within a vehicle surface proximate to the vehicle windshield in response to at least one of the control signal and a user request.

7. The apparatus of claim 1 wherein the heating pad is deployed from a recess within a vehicle surface proximate to the vehicle windshield such that the heating pad convers a portion of an inside surface of the vehicle windshield after deployment.

8. The apparatus of claim 1 further including a user interface operative to receive a user request wherein the user request is received in response to a prompt displayed on the user interface and wherein the prompt is generated in response to the temperature outside of the vehicle cabin being below the threshold.

9. A method comprising:
   detecting a temperature outside of a vehicle cabin;
   detecting a run state condition of a vehicle;
   engaging a power supply in response to the temperature outside of the vehicle cabin being below a threshold and the run state of the vehicle being operative to apply a voltage to a heating element proximate to a vehicle windshield wherein the heating element includes a carbon nanotube pad operative to generate an infrared radiation in response to the voltage and a reflective surface positioned to reflect infrared radiation from the carbon nanotube heating pad towards the vehicle windshield;
   receiving a user input via a the user interface; and
   disengaging the power supply in response to the user input to decouple the voltage from the heating element.

10. The method of claim 9 wherein the heating element is configured as a thin flexible sheet and wherein the carbon nanotube pad is the first side of the sheet and the reflective surface is the second side of the sheet.

11. The method of claim 9 wherein the carbon nanotube pad is nonwoven and is operative to emit an infrared radiation in response to the voltage.

12. The method of claim 9 wherein a magnitude of the voltage is selected in response to the temperature outside of the vehicle cabin.

13. The method of claim 9 wherein the power supply is operative to generate a pulse width modulated voltage for application to the heating element.

14. The method of claim 9 wherein the heating element is deployed from a recess within a vehicle surface proximate to the vehicle windshield such that the heating element covers a portion of an inside surface of the vehicle windshield after deployment.

15. The method of claim 9 wherein the heating element is deployed from a recess within a vehicle surface proximate to the vehicle windshield in response to the temperature outside of the vehicle cabin being below the threshold and the run state of the vehicle being operative.

16. A vehicle windshield heating apparatus comprising:
   a temperature sensor operative to detect a temperature outside of a vehicle cabin;
   a run state detector operative to detect a run state condition of a vehicle;
   a light detector operative to detect a light intensity through a vehicle windshield;
   a heating element having a carbon nanotube heating pad and a reflective surface wherein the carbon nanotube heating pad is positioned towards the vehicle windshield and the reflective surface is positioned away from the vehicle windshield such that the reflective surface is positioned to reflect infrared radiation from the carbon nanotube heating pad towards the vehicle windshield;
   a power supply operative to supply a voltage to the carbon nanotube heating pad in response to a control signal; and a processor operative to generate the control signal in response to the temperature outside of the vehicle cabin being below a threshold and the run state of the vehicle indicating a run state of the vehicle being operative.

17. The vehicle windshield heating apparatus of claim 16, wherein a magnitude of the voltage is established in response to the temperature outside of the vehicle cabin.

18. The vehicle windshield heating apparatus of claim 16 wherein the processor is further operative to generate the control signal in response light intensity being less than a threshold value indicative of an obscured windshield and wherein the processor is further operative to cease the control signal in response to the light intensity being higher than a second threshold value indicative of clear windshield.

19. The vehicle windshield heating apparatus of claim 16 wherein the voltage is a pulse width modulated voltage.

20. The vehicle windshield heating apparatus of claim 16 wherein the voltage is a pulse width modulated voltage and wherein a pulse width of the pulse width modulated voltage is selected in response to the temperature outside of the vehicle cabin.

* * * * *